(12) United States Patent
Hobbs

(10) Patent No.: US 8,851,364 B2
(45) Date of Patent: Oct. 7, 2014

(54) DELIVERING REPORT CHARACTERIZATION INFORMATION OF A REPORT

(75) Inventor: Godfrey Hobbs, Vancouver (CA)

(73) Assignee: Business Objects Software Limited, Dublin (IE)

( * ) Notice: Subject to any disclaimer, the term of this patent is extended or adjusted under 35 U.S.C. 154(b) by 120 days.

(21) Appl. No.: 13/487,324

(22) Filed: Jun. 4, 2012

(65) Prior Publication Data

US 2013/0320078 A1 Dec. 5, 2013

(51) Int. Cl.
*G06F 17/00* (2006.01)

(52) U.S. Cl.
USPC ..................... 235/375; 235/462.09

(58) Field of Classification Search
CPC . G06K 19/06037; G06K 7/1417; G06K 7/10; G06K 9/18; G06Q 30/0201; G06F 17/00
USPC ................. 235/375, 462.01, 462.09
See application file for complete search history.

(56) References Cited

U.S. PATENT DOCUMENTS

| | | | | |
|---|---|---|---|---|
| 7,315,713 | B2 * | 1/2008 | Parry et al. ..................... | 399/182 |
| 2007/0114288 | A1 * | 5/2007 | Sparzo et al. ............ | 235/472.03 |
| 2008/0016086 | A1 * | 1/2008 | Chang et al. .................. | 707/100 |
| 2008/0033876 | A1 * | 2/2008 | Goldman et al. ............... | 705/42 |

OTHER PUBLICATIONS

Martin De Jode et al; Tales of things—the story so far; Proceedings of the 2011 international workshop on Networking and object memories for the internet of things (2011); published by ACM; 2 pages; (http://www.mendeley.com/research/tales-things-story-so-far/).
Hiroko Kato et al.; Pervasive 2D Barcodes for Camera Phone Applications; published in IEEE Pervasive Computing; vol. 6 Issue 4, Oct. 2007; pp. 11 (http://dl.acm.org/citation.cfm?id=1308671).
Scanlife; 2D Barcode publishing; A Guide to Best Practices; pp. 11; Copyright ScanLife 2011 (http://www.scanlife.com/pdf/scanlife_best_practices_whitepaper.pdf).
Scanlife; ScanLife; Every Product has a story; pp. 28; Copyright ScanLife 2011 (http://www.scanlife.com/pdf/scanlife_intro_presentation.pdf).
Ivor Tossell; QR codes are suddenly everywhere; pp. 4; published online Sep. 26, 2011 (http://www.theglobeandmail.com/report-on-business/small-business/sb-digital/web-strategy/qr-codes-are-suddenly-everywhere/article4203314/).
Key-Systems GmbH; QR Codes—One Code for a Variety of Information; p. 1; Key-Systems GmbH 1998-2012; St. Ingbert, Germany (http://www.key-systems.net/qrcode/index.php?lang=en).
Scanlife; Client Profile; Scanlife; retrieved on-line on Mar. 6, 2012; p. 1 (http://www.scanlife.com/en/component/clients/?view=details&id=19).

* cited by examiner

Primary Examiner — Daniel St Cyr

(57) ABSTRACT

Various embodiments of systems and methods for including report characterization information in a report are described herein. A report designer may request insertion of a two dimensional barcode, in the report, which encodes the report characterization information. Based on the request, a report characterization information retrieval formula may be executed to retrieve the report characterization information. The retrieved report characterization information may then be encoded to obtain a two dimensional barcode. The obtained two dimensional barcode may finally be inserted into the report. Once the report is printed, the two dimensional barcode in the report may be scanned by any device with a bar code reader, such as a smart phone to retrieve the additional information related to the report.

22 Claims, 9 Drawing Sheets

DELIVERING REPORT CHARACTERIZATION INFORMATION OF A REPORT

FIELD

Embodiments generally relate to computer systems, and more particularly to methods and systems for delivering report characterization information of a report.

BACKGROUND

Data visualization and data driven reporting is key to business. Usually, these data visualizations or reports may be used by many users for different purposes. Some of these users may have questions that require report characterization information related to the data visualization or to the data report. Electronic viewing may sometime provide these report characterization information based on techniques such as section drill-down. However, these techniques require a "smart" report viewer such as Crystal Reports® thick client viewer. In case the "smart" report viewer is not available the user cannot obtain the report characterization information related to the data visualization or the data report.

BRIEF DESCRIPTION OF THE DRAWINGS

The claims set forth the embodiments of the invention with particularity. The invention is illustrated by way of example and not by way of limitation in the figures of the accompanying drawings in which like references indicate similar elements. The embodiments of the invention, together with its advantages, may be best understood from the following detailed description taken in conjunction with the accompanying drawings.

DETAILED DESCRIPTION

Embodiments of techniques for delivering report characterization information of a report are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment", "this embodiment" and similar phrases, means that a particular feature, structure, or characteristic described in connection with the embodiment is included in at least one embodiment of the present invention. Thus, the appearances of these phrases in various places throughout this specification are not necessarily all referring to the same embodiment. Furthermore, the particular features, structures, or characteristics may be combined in any suitable manner in one or more embodiments.

Figure 1:
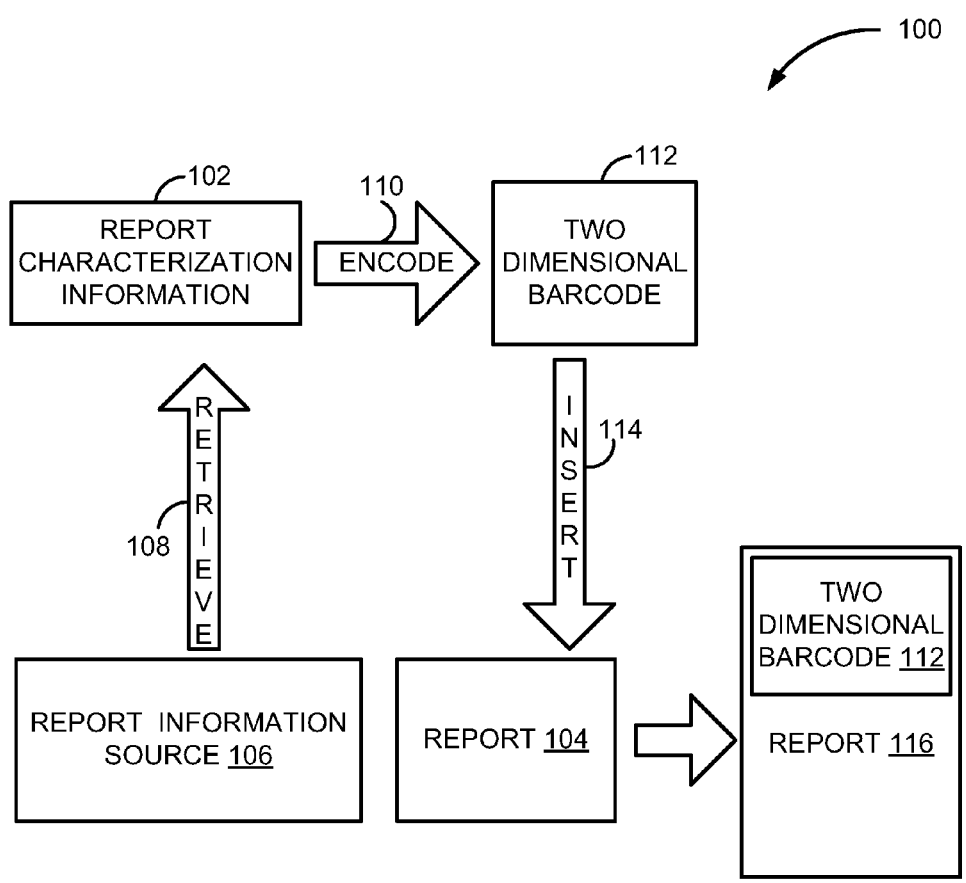
FIG. 1 is a block diagram illustrating a method to include report characterization information to a report, according to an embodiment.

FIG. 1 is a block diagram illustrating a method 100 to include a report characterization information 102 to a report 104, according to an embodiment. A report 104 may refer to information automatically retrieved (i.e., in response to computer executable instructions) from a data source (e.g., a database, a data warehouse, and the like), where the information is structured in accordance with a report schema that specifies the form in which the information should be presented. In one embodiment, the report 104 may be a business intelligence report, such as a Crystal Reports® report, which includes business related information such as sales revenue by products and/or departments, or by associated costs and incomes.

A report information source 106 may store information related to the report 104. For example, the report information source 106 may store report 104 metadata information, such as the creation date of the report 104, the name of persons creating the report 104, etc., the report 104 definition, which may include the report objects in the report 104, the grouping used in the report 104, etc., the data provenance of the report data sources used for creating the report 104, and the metadata of the data sources used for creating the report 104, etc. The report information source 106 may include a report file (.rpt file) of the report 104, the data sources used for creating the report 104, or any other files/databases storing information related to the report 104. For example, consider a sales report including the sales values of a company X for Q1 to Q4 of 2011. A sales report information source for the sales report may store the sales report metadata information, such as creation date of the sales report (Apr. 26, 2012), an author of the sales report (Bob Smith), and the sales report's source metadata, which includes the name of data source used for creating the sales report ("sales" database), etc.

Initially, for inserting the report characterization information 102 in the report 104, the report characterization information 102 is retrieved 108 from the report information source 106. In one embodiment, a pre-defined report characterization information retrieval formula, defined to retrieve 108 the report characterization information 102 from the report 104, may be executed for retrieving the report characterization information 102 from the report information source 106. In the above example, a pre-defined report characterization information retrieval formula may be executed to retrieve sales report metadata (the creation date of the report (Apr. 26, 2012), and author of the report (Bob Smith)) from the sales report information source. Next, the retrieved report characterization information 102 may be encoded 110 to obtain a two dimensional barcode 112, such as a QR Code, a Quick Response code, a data matrix code, etc. A two dimensional barcode is an image-based machine-readable representation of data encoded by the barcode. The two dimensional barcode 112 is an image-based machine readable representation of the retrieved report characterization information 102. In the above example, the retrieved sales report metadata (creation date of the report (Apr. 26, 2012) and author of the report (Bob Smith)) of the sales report is encoded to obtain a two dimensional barcode. Finally, the two dimensional barcode 112 may be inserted 114 into the report 104 to obtain a report 116. The obtained report 116 represents the report 104 with the report characterization information 102 encoded in the form of a two dimensional barcode 112. In the above example, the two dimensional barcode, including the encoded sales report metadata is inserted into the report.

A user viewing a printed or an exported copy of the report 116 may want to view the report characterization information of the report 116. In this case, the user may use a device, for example a smartphone, with a two dimensional barcode reader application that scans and decodes the two dimensional barcode in the report 116 to obtain the report characterization information 102. The obtained report characterization information 102 may then be displayed on the smartphone of the user. Thus, encoding 110 the report characterization information 102 in form of a two dimensional barcode 112 and then inserting 114 the two dimensional barcode 112 in the report 104 allows a user to view the report characterization information 102, without using a "smart" report viewer. In the above example, a user may receive the sales report with the two dimensional barcode as a hard copy or as an attachment of an E-Mail. The user may use their phone's two dimensional barcode reader application to scan and decode the two dimensional barcode included in the report to obtain the report characterization information (creation date of the report (Apr. 26, 2012) and author of the report (Bob Smith)) related to the report, which may then be displayed on the user's phone screen.

Figure 2A:
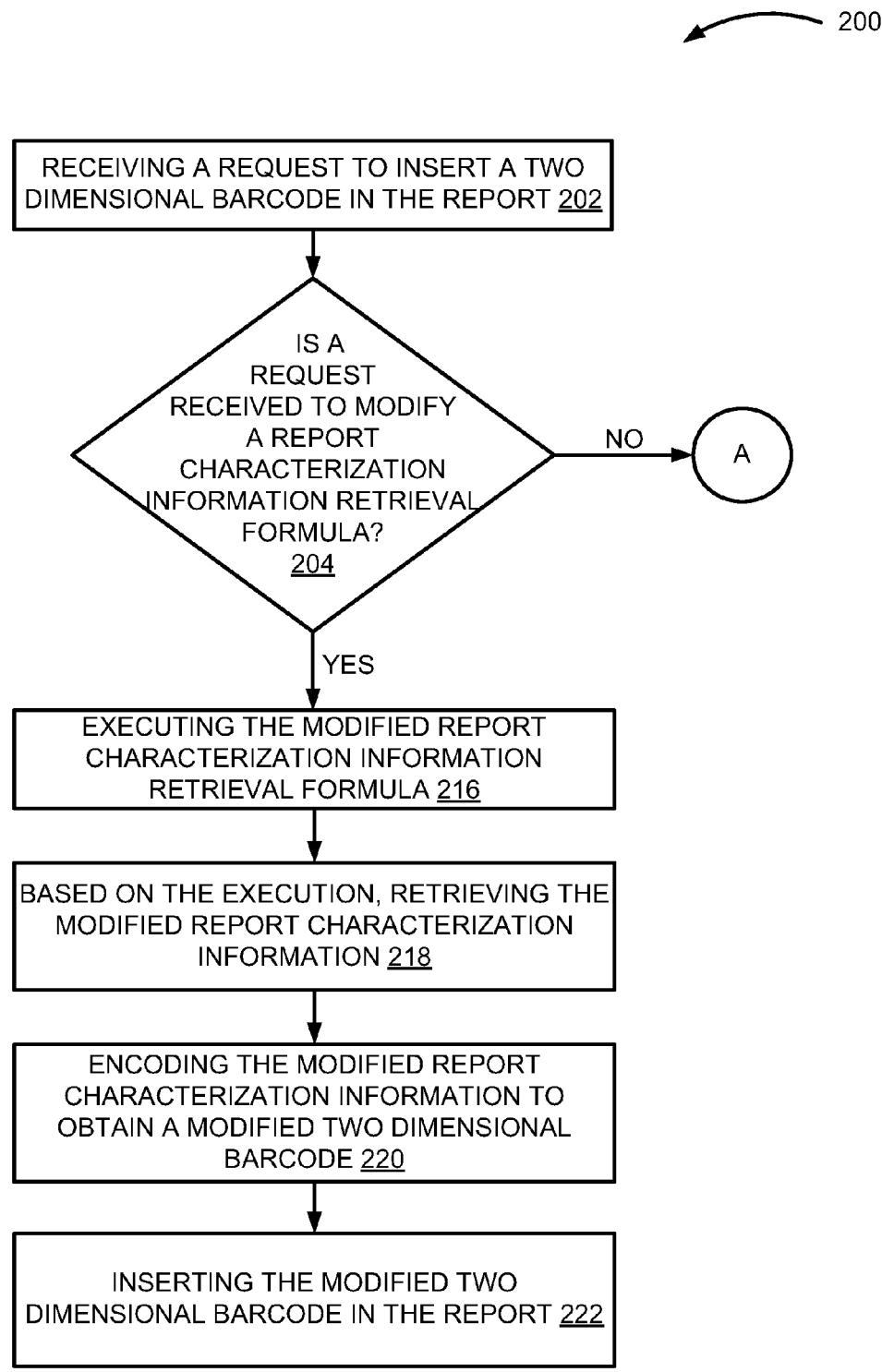
FIGS. 2A-2B is a detailed flow diagram illustrating a method for including report characterization information in a report, according to an embodiment.
Figure 2B:
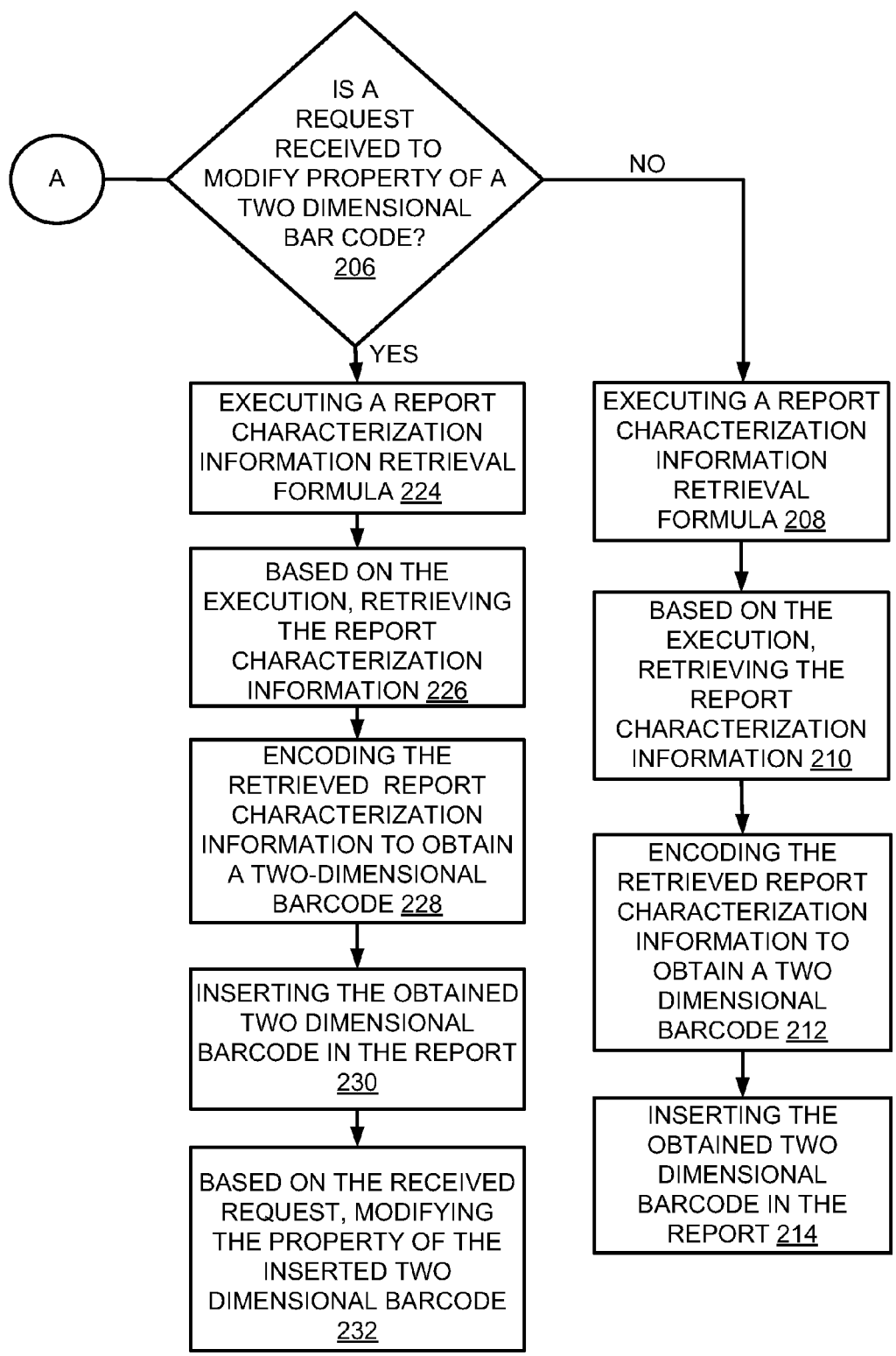

FIGS. 2A-2B is a detailed flow diagram 200 illustrating a method for including report characterization information in a report, according to an embodiment. In one embodiment, the steps 202-206 of the flow diagram 200 are performed at design time, during the creation of the report. Initially at block 202 a report designer, designing the report, may request insertion of a two dimensional barcode in the report. A two dimensional barcode is an image-based machine readable representation of information. The two dimensional barcode may be, for example, a Quick Response (QR) code, a Data Matrix code, or any other two dimensional barcode. In one embodiment, the report designer may request insertion of the two dimensional barcode in the report for inserting report characterization information of the report. Based on the received request to insert the two dimensional barcode, a placeholder image of a two dimensional barcode may be inserted in the report. The placeholder image of the two dimensional barcode may act as a placeholder object for the two dimensional barcode. A placeholder object is a visual representation of an object without details and indicates the in-progress nature of the object. The placeholder image of the two dimensional bar code inserted in the report may not be storing any data. In one embodiment, the two dimensional barcode is a report object of the report. A report object is a building block of a report. For example, text objects, such as title of the report, table objects, header/footer objects, etc. are report objects of the report. The report designer may perform general report object operations, such as copy, paste, rotation, or deletion, on the two dimensional barcode.

A report may represent information either in a graphical form (chart, graphs, etc.) or a non-graphical form (text, tabular data, etc.). In case the report represents information in a graphical form, such as a chart, the report designer, may during designing the report, selects an option "insert a two dimensional barcode on chart" to request insertion of the two dimensional barcode in the chart (visual representation of information). Based on the request, a placeholder image of a two dimensional barcode may be inserted automatically in the report. The placeholder image of the two dimensional barcode may be positioned layered above the "top right" or "top left" corner of the chart. The placeholder image of the two dimensional barcode may have standard width and height. In case the chart does not have enough space for inserting the placeholder image of the two dimensional barcode then the placeholder image may not be inserted into the report and a pop-up error message may be displayed to the report designer. On receiving the pop-up error message, the report designer may adjust the size of the chart such that the placeholder image of the two dimensional barcode may be inserted into the report. Upon successful insertion, the report designer may also adjust the size of the chart or the size of the two dimensional bar code, such that the placeholder image of the two dimensional barcode does not cover important parts of the report. In another embodiment, if the report does not include a graphical representation of the information, the report designer may select an "insert the two dimensional code in the whole report" option for requesting insertion of the two dimensional bar code. Based on the received request, the placeholder image of the two dimensional barcode may be inserted in a pre-defined position, such as a footer section, of the report. The report designer may expand the footer section, in case the placeholder image of the two dimensional barcode does not fit in the footer section. For example, consider a product ABC sales report that includes a chart illustrating the sales value of the product ABC in three countries USA, Canada, and Germany. A report designer designing the product ABC sales report may choose an option "Add two dimensional barcode in the chart" to request insertion of a two dimensional barcode in the chart. Based on the request, a placeholder image of a two dimensional barcode may be inserted in the report.

In one embodiment, a report characterization information retrieval formula may be provided for retrieving the report characterization information related to the report. The report characterization information retrieval formula related to the report may be a pre-defined formula defined to retrieve the report characterization information, which is to be included in the report. The pre-defined information retrieval formula may be modified by the report designer. In one embodiment, the report characterization information retrieval formula may be defined to retrieve the report characterization information, which is to be encoded by the two dimensional barcode requested to be inserted in the report at block 202. In one embodiment, the report characterization information includes additional information related to the report, not included in the report. For example, the report characterization information may include report's metadata, such as data of creating/modifying the report, the name of the creator of the report, etc. The report characteristic information may include information required to re-create the report. For example, the report information characterization information may include information about data source used for creating the report, the Sequential Query Language (SQL) statements used in the report, etc. The report characterization information retrieval formula may be a formula containing one or more expressions, which define the report characterization information to be included in the report. In the above example, a pre-defined report characterization information retrieval formula may be "Get data source || Get SQL statement", the expressions "data source" and "SQL statement" together define the report characterization information to be included in the report.

In one embodiment, the pre-defined report characterization information retrieval formula may call functions which return the report characterization information (report definition, Structured Query Language (SQL) statements of the report, and a data source's metadata, which includes information about the data source used for creating the report). A report definition controls the appearance of the report and may include, for example, the report objects included in the report, the definition of each section of the report and all fields within the section, the tables used in the report, the record and group selection criteria used for records and groupings, respectively, included in the report, the formulas used in the report, etc. The data source metadata may include the metadata information related to the data sources used for creating the report. For example, the data source metadata may include information about the different data cleansing methods used for creating the report, the name of the data source, such as database table name, used for creating the report, etc. The SQL statements list the subset of data source tables from which the report is created and conditions for retrieving the data from these tables. The report characterization information retrieval formula may be defined to retrieve the report characterization information from different report information sources storing report information. For example, the report characterization information retrieval formula may be defined to retrieve the report definition and the SQL statements from a report file (.rpt file) (report information source), which contains a record of the information used to generate the report. The report characterization information retrieval formula may also be defined to retrieve the data source metadata from the data sources (report information source) used for creating the report. In one embodiment, applications, for example SAP® Business Object Information Steward refine, retrieve and consolidate data source metadata information such as the Quality Score from different data sources, which may then be provided to the report characterization information retrieval formula. The data source metadata information could include data lineage, trust information, metadata on usage, and the like. This information is provided via various capabilities of the formula language.

Next at block 204, a check may be performed to determine whether a request is received to modify a report characterization information retrieval formula. In one embodiment, the request to modify the report characterization information retrieval formula may be received from the report designer. The obtained modified report characterization information retrieval formula may be defined to retrieve the modified report characterization information. In one embodiment, the modified report characterization information is the report characterization information, for example, the report's definition, the report's data source metadata, the SQL statements used in the report, etc., defined to be retrieved by the modified report characterization information retrieval formula. The report designer may modify the report characterization information retrieval formula by modifying the formula text included in the pre-defined report characterization information retrieval formula. In one embodiment, the report characterization information retrieval formula may be modified by adding expressions to the pre-defined report characterization information retrieval formula using a report formula language. The added expression in the modified report characterization information retrieval formula refers to the new report information that the report designer wants to be included in the report. The report designer may include any valid report formula constructs in the pre-defined report characterization information retrieval formula for modifying the report characterization information retrieval formula. For example, the report designer may add a formula construct ("GET creation date") to the pre-defined report characterization information retrieval formula to obtain a modified report characterization information retrieval formula. The obtained modified report characterization information retrieval formula may be defined to retrieve the report characterization information defined by the pre-defined report information retrieval formula and the report metadata, referred by the formula construct "GET report metadata". In one embodiment, the report designer may add their decisions related to the creation of the report as a literal string ("I ignored the sales values for quarter that has a value less than 10k $"). The modified report characterization information may be stored in a report file. In the above example, the report designer may modify the pre-defined report characterization information retrieval formula "Get data source || Get SQL statement" to add a literal string "IGNORE SALES VALUE OF ASIAN COUNTRIES" in the report characterization information retrieval formula. The modified report characterization information retrieval formula "Get data source || Get SQL statement || IGNORE SALES VALUE OF ASIAN COUNTRIES" is defined to retrieve the data source of the sales report, the SQL statements used in the sales report, and to add the literal string "IGNORE SALES VALUE OF ASIAN COUNTRIES" in the report.

In case, a request for modifying the report characterization information retrieval formula is not received (condition in block 204 is false) then a check may be performed at block 206 to determine whether a request is received for modifying the property of the two dimensional bar code, which the report designer has requested to be inserted in the report at block 202. As a two dimensional bar code is a report object, the two dimensional barcode may include the standard properties of a report object. For example, the standard properties of the report object may include the color of the report object, which a report designer may select according to their choice. In addition to the standard properties of the report object, the two dimensional barcode, which the designer wants to include the report, may include some additional properties specific to the two dimensional barcode. For example, an additional property of the two dimensional barcode report object may be "suppress the two dimensional barcode if the report is being viewed in a rich client viewer" property. In one embodiment, the report designer may modify this property of the report object by setting it to true. After, the report designer sets the "suppress the two dimensional barcode if the report is not being viewed in a rich client viewer" property to true the two dimensional barcode is not displayed when the report is viewed in a rich client viewer. In this example, the bar code may still be rendered at print or export time.

In case a request for modifying the report characterization information retrieval formula and the property of the two dimensional barcode is not received (that is, the conditions in blocks 204 and 206 are both false) then the blocks 208-214 may be executed at run time, when a report designer refreshes the report. Initially at block 208, the report characterization information retrieval formula may be executed. In one embodiment, the pre-defined report characterization information retrieval formula may be executed. The pre-defined report characterization information retrieval formula may be executed to retrieve the report characterization information (block 210). The report characterization information retrieval formula may retrieve the report characterization information from different report information sources, such as report files, data sources using for creating the report, etc. In one embodiment, executing the report characterization information retrieval formula includes evaluating the report characterization information retrieval formula. Evaluating the report characterization information retrieval formula includes replacing the formula's expressions with report characterization information. In the above example, the report characterization information retrieval formula "Get data source || Get SQL statement" may be executed to retrieve the report characterization information, which includes the data source ("ABC sales database") of the product ABC sales report and an SQL statement (SELECT "COUNTRY NAME", "SALE VALUE" FROM "ABC SALES") of the product ABC sales report.

In one embodiment, the report characterization information retrieval formula may be executed to retrieve the report characterization information of a portion of the report. In this case, the report characterization information retrieval formula retrieves the report characterization information, based on the context information of the portion of the report. The selected portion of the report may be an enclosed portion of the report, selected by a user. The context information may be, for example, the relative position of the formula in the report. For example, consider a report that includes two charts: a first sales chart showing the sales of a product "XYZ" in different countries and a second sales chart showing the sale of product XYZ for quarter 1 to quarter 4. In this case, the same report characterization information retrieval formula "Get SQL" may retrieve different SQL statements based on whether the report characterization information retrieval formula is positioned on the first sales chart or the second sales chart.

Next at block 212, the report characterization information retrieved at block 210 is encoded to obtain a two dimensional barcode. The encoded two dimensional barcode is an image-based machine readable representation of the report characterization information retrieved at block 210. The report characterization information related to the report may be converted to text and the obtained text may then be encoded to obtain the two dimensional barcode. In one embodiment, the obtained two dimensional barcode is a dynamic two dimensional barcode as the retrieved report characterization information, encoded by the two dimensional barcode, is not fixed and varies according to the report characterization information of the report. In one embodiment, if the retrieved report characterization information is an SQL statement then the SQL statement may be converted to a relational algebra tree. The obtained relational algebra tree may then be encoded to obtain a two dimensional barcode. In the above example, the report characterization information ("ABC sales database" and the SQL statement (SELECT "COUNTRY NAME", "SALE VALUE" FROM "ABC SALES")) is encoded to obtain a two dimensional barcode, which includes the encoded report characterization information.

Finally at block 214, the obtained two dimensional barcode may be inserted to the report. In one embodiment, inserting the two dimensional barcode in the report includes replacing the placeholder image of the two dimensional barcode included in the report at block 202 with the two dimensional barcode obtained at block 212. In the above example, the obtained barcode may be inserted into the product ABC sales report by replacing the placeholder image of the two dimensional barcode with the obtained two dimensional barcode.

In one embodiment, if a request to modify the report characterization information retrieval formula is received (condition in block 204 is true) then the blocks 216-222 may be executed. The blocks 216-222 may be executed at run time, when the report designer refreshes the report. Initially at block 216, the report designer may execute the modified report characterization information retrieval formula obtained at block 204. The modified report characterization information retrieval formula may be executed to retrieve the modified report characterization information (block 218). The modified report characterization information related to the report may be retrieved from a report information source. In the above example, the modified report characterization information retrieval formula ("Get data source || Get SQL statement || IGNORE SALES VALUE OF ASIAN COUNTRIES") may be executed to retrieve the modified report characterization information ("ABC sales database", the SQL statement (SELECT "COUNTRY NAME", "SALE VALUE" FROM "ABC SALES"), and "IGNORE SALES VALUE OF ASIAN COUNTRIES") related to the report.

Next at block 220, the modified report characterization information retrieved at block 218 may be encoded to obtain the modified two dimensional barcode. The obtained two dimensional barcode may store the retrieved report characterization information. In the above example, the obtained modified two dimensional barcode may encode the modified report characterization information ("ABC sales database", the SQL statement (SELECT "COUNTRY NAME", "SALE VALUE" FROM "ABC SALES") and "IGNORE SALES VALUE OF ASIAN COUNTRIES").

Finally at block 222, the obtained modified two dimensional barcode may be inserted into the report. The obtained modified two dimensional barcode may be inserted into the report by replacing the placeholder image of the two dimensional barcode, inserted to the report at block 202, with the modified two dimensional barcode obtained at block 220. In the above example, the modified two dimensional barcode may be inserted into the ABC sales report. In one embodiment, processing continues at block 206 the modified formula now included in the two dimensional barcode is generically called, without loss of generality, the formula in blocks 224-232.

In one embodiment, if the request to modify the property of two dimensional barcode is received (condition in block 206 is true) then the blocks 224-232 may be executed. The blocks 224-232 may be executed at run time, when the report designer refreshes the report. In one embodiment, the execution of the blocks 224-230 may be similar to the execution of the blocks 208-214. Initially, at block 224 the pre-defined report characterization information retrieval formula may be executed. The pre-defined report characterization information retrieval formula may be executed to retrieve the report characterization information (block 226). Next at block 228, the retrieved report characterization information is encoded to obtain a two dimensional barcode, which is then inserted into the report (block 230). Finally at block 232, the property of the inserted two dimensional barcode is modified based on the request received at block 206. In one embodiment, the property of the inserted two dimensional barcode is changed by setting to true the modified property of the two dimensional barcode. For example, the "suppress the two dimensional barcode if the report is being viewed in a rich client viewer" property of the two dimensional barcode may be set as true. Setting this property to true may result the two dimensional barcode, inserted into the report at block 230, being rendered only at print or export time. However, when the report is being viewed in a rich client viewer, such as Crystal Report®, the two dimensional barcode inserted in the report may not be displayed. This may allow the user an uncluttered viewing experience when the report is viewed in a rich client viewer.

Figure 3:
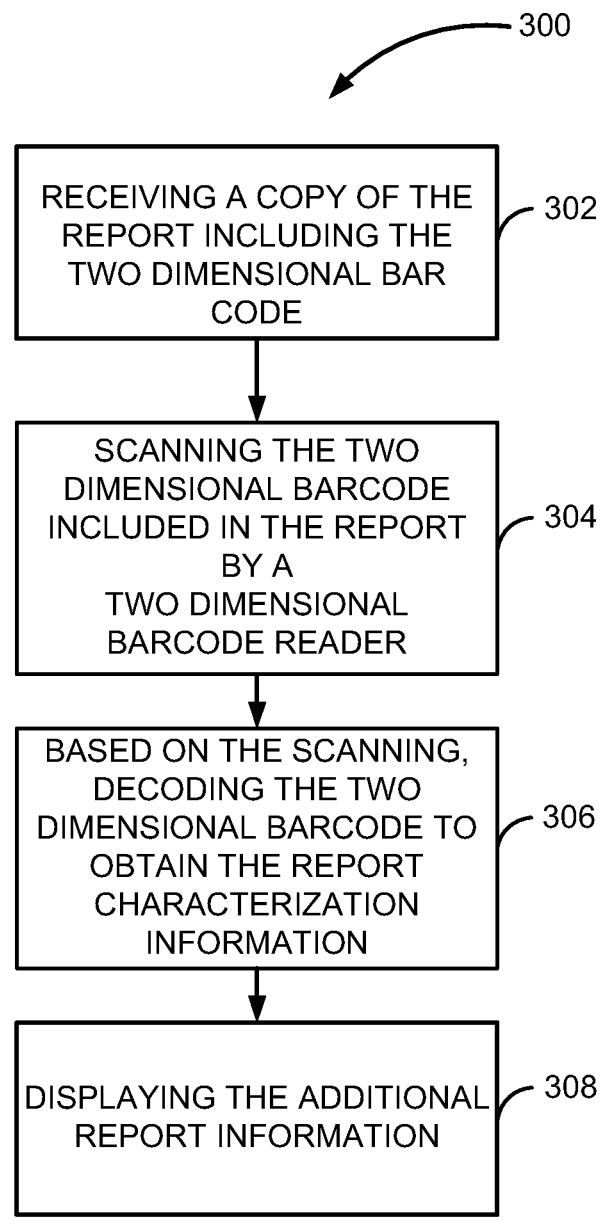
FIG. 3 is a flow diagram illustrating a method for retrieving the report characterization information encoded by the two dimensional barcode, according to an embodiment.

FIG. 3 is a flow diagram 300 illustrating a method for retrieving the report characterization information encoded by the two dimensional barcode, according to an embodiment. Initially at block 302, a copy of the report including the two dimensional barcode may be received. In one embodiment, the copy of the report may include a hard copy of the report or a soft copy, for example, a PDF or an E-Mail attachment, of the report. The two dimensional barcode inserted into the report may store the encoded report characterization information. In the above example, a hard copy of the ABC sales report including the inserted barcode, storing the encoded report characterization information ("ABC sales database" and the SQL statement (SELECT "COUNTRY NAME", "SALE VALUE" FROM "ABC SALES")) may be printed.

Next at block 304, a two dimensional barcode reader may scan the two dimensional barcode included in the report. A user may position a device, for example a mobile phone with a two dimensional barcode reader application on the two dimensional barcode for scanning the two dimensional barcode included in the report. Based on the scanning, the two dimensional barcode reader may decode the report characterization information encoded by the two dimensional barcode to obtain the report characterization information (block 306). In the example above, a user may scan the two dimensional barcode included in the report with their mobile phone's barcode reader application to obtain the report characterization information ("ABC sales database" and the SQL statement (SELECT "COUNTRY NAME", "SALE VALUE" FROM "ABC SALES")) encoded in the two dimensional barcode.

Finally at block 308, the report characterization information obtained at block 306 may be displayed to the user. The obtained report characterization information may be displayed on the device used for scanning the two dimensional barcode. In the above example, the report characterization information ("ABC sales database" and the SQL statement (SELECT "COUNTRY NAME", "SALE VALUE" FROM "ABC SALES")) may be displayed on the mobile phone of the user, providing the user a rich viewing experience of the printed ABC sales report.

Figure 4:
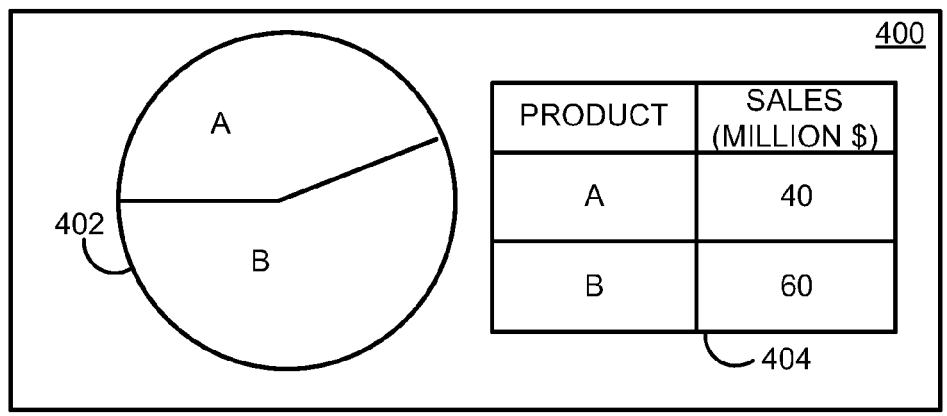
FIG. 4 is an exemplary report including a chart, according to an embodiment.

FIG. 4 is an exemplary report 400 including a chart 402 and a table 404, according to an embodiment. The chart 402 represents the sales values of products A and B according to the data in the table 404. A report designer designing the report 400 may want to include report characterization information to the report 400. In one embodiment, the report designer may request insertion of a two dimensional barcode in the report 400 for including the report characterization information to the report 400. The report designer may select a "insert two dimensional barcode on chart" option for requesting insertion of the two dimensional barcode in the report 400.

Figure 5:
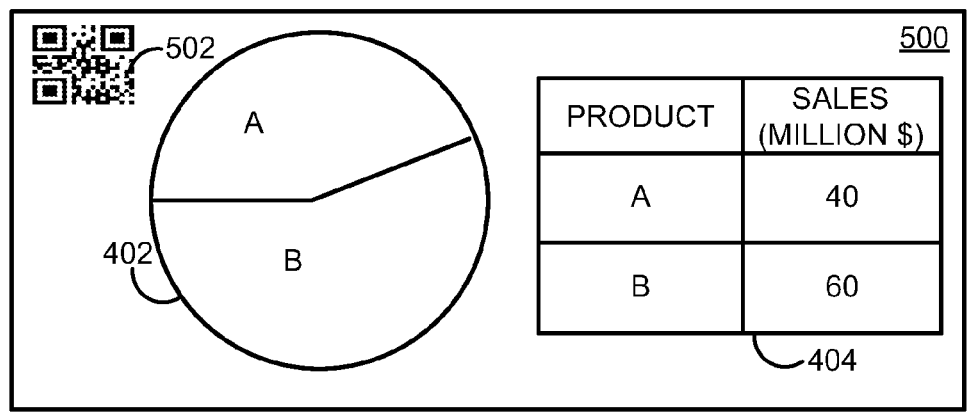
FIG. 5 illustrates a report including a placeholder image of a two dimensional barcode, according to an embodiment.

FIG. 5 illustrates a report 500 including an image 502 of a two dimensional barcode, according to an embodiment. The report 500 may be obtained by inserting an image 502 of a two dimensional barcode in the report 400 of FIG. 4. The image 502 of the two dimensional barcode may be inserted into the report 400 of FIG. 4 after receiving the request to insert the two dimensional barcode in the report 400 of FIG. 4.

Figure 6:
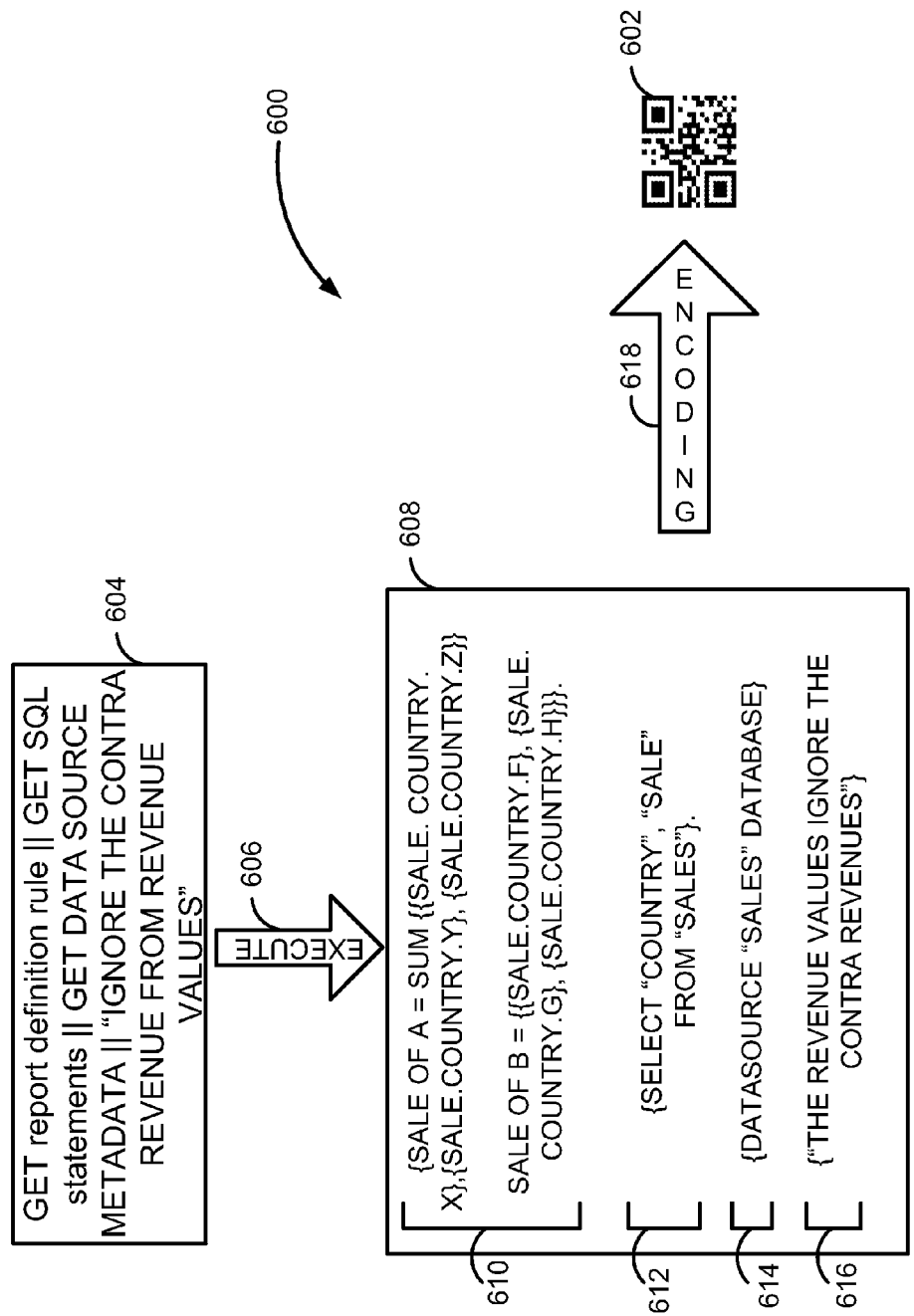
FIG. 6 is an exemplary block diagram illustrating a method for obtaining a two dimensional barcode to be inserted in the report of FIG. 4, according to an embodiment.

FIG. 6 is an exemplary block diagram 600 illustrating a method for obtaining a two dimensional barcode 602 to be inserted in the report 400 of FIG. 4, according to an embodiment. The method 600 may be performed when the report designer refreshes the report 500 of FIG. 5, after the image 502 of the two dimensional barcode has been inserted in the report. Initially, a pre-defined report characterization information retrieval formula 604 may be executed 606 to retrieve report characterization information 608 of the report 400 of FIG. 4. The report characterization information retrieval formula 604 may be defined to retrieve a report definition rule of the report 400 of FIG. 4, SQL statements used in the report 400 of FIG. 4, metadata information of the data source used for creating the report 400 of FIG. 4, and the report designer's assumption "THE REVENUE VALUES IGNORE THE CONTRA REVENUE" for creating the report 400 of FIG. 4. The report characterization information 608 obtained after executing the report characterization information retrieval formula includes the retrieved report definition rule 610 used for creating the report 400 of FIG. 4, the SQL statement 612 used in the report 400 of FIG. 4, the data source metadata information 614, which includes the name ("sales" database) of the data source used for creating the report 400 of FIG. 4. The report characterization information 608 also includes the report designer's assumption 616 "THE REVENUE VALUES IGNORE THE CONTRA REVENUE", for creating the report 400 of FIG. 4. The obtained report characterization information 608 may be encoded 618 to obtain the two dimensional barcode 602.

Figure 7:
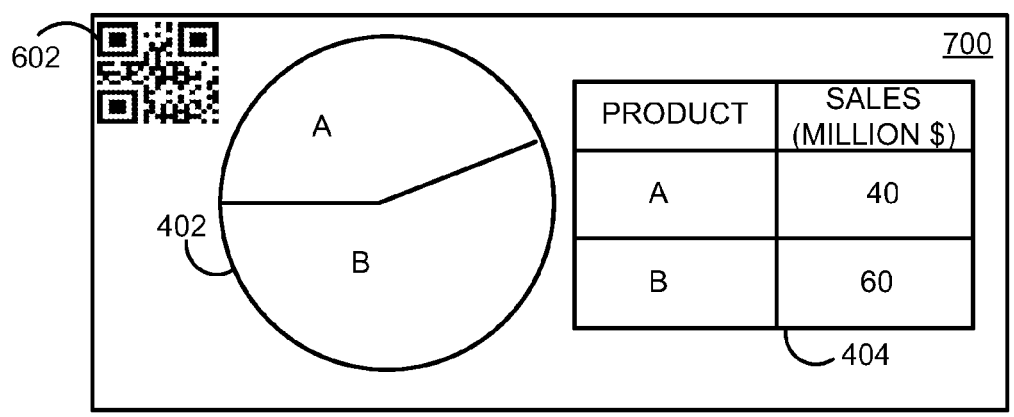
FIG. 7 illustrates an exemplary report including the two dimensional barcode obtained in FIG. 6, according to an embodiment.

FIG. 7 illustrates an exemplary report 700 including the two dimensional barcode 602 obtained in FIG. 6, according to an embodiment. The report 700 may be obtained by replacing the image 502 of the two dimensional barcode in the report 500 of FIG. 5 with the two dimensional barcode 602 obtained in FIG. 6. The report 700 includes the chart 402 included in the report 400 of FIG. 4 and the report characterization information of the report 400 of FIG. 4, encoded in the form of the two dimensional barcode 602 of FIG. 6.

Figure 8:
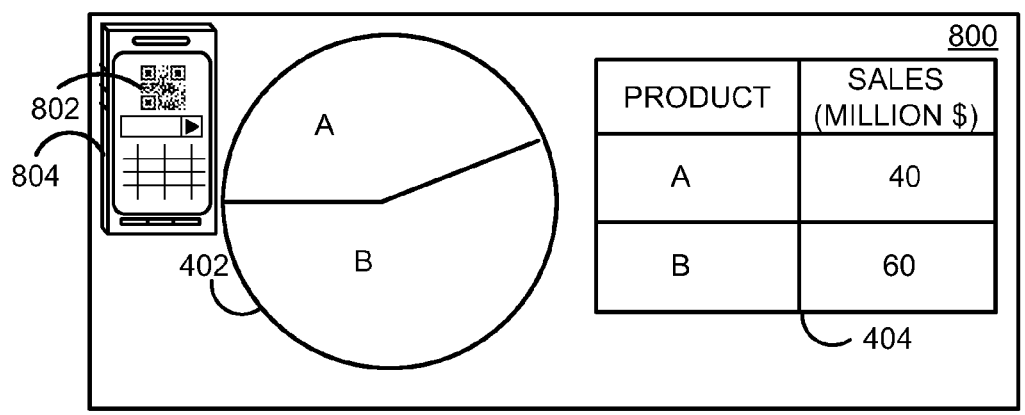
FIG. 8 illustrates an exemplary report representing a copy of the report of FIG. 7, according to an embodiment.

FIG. 8 illustrates an exemplary report 800 representing a copy of the report 700 of FIG. 7, according to an embodiment. The report 800 may be a hard copy or a soft copy of the report 700 of FIG. 7. As shown, a user may scan the two dimensional barcode 802 that was previously inserted in the report 800 using their smartphone's 804 two dimensional barcode reader application. The two dimensional barcode reader application scans the two dimensional barcode to decode the report characterization information encoded in the two dimensional barcode. The two dimensional barcode reader may decode the two dimensional barcode to obtain the report characterization information of the report 800 of FIG. 8.

Figure 9:
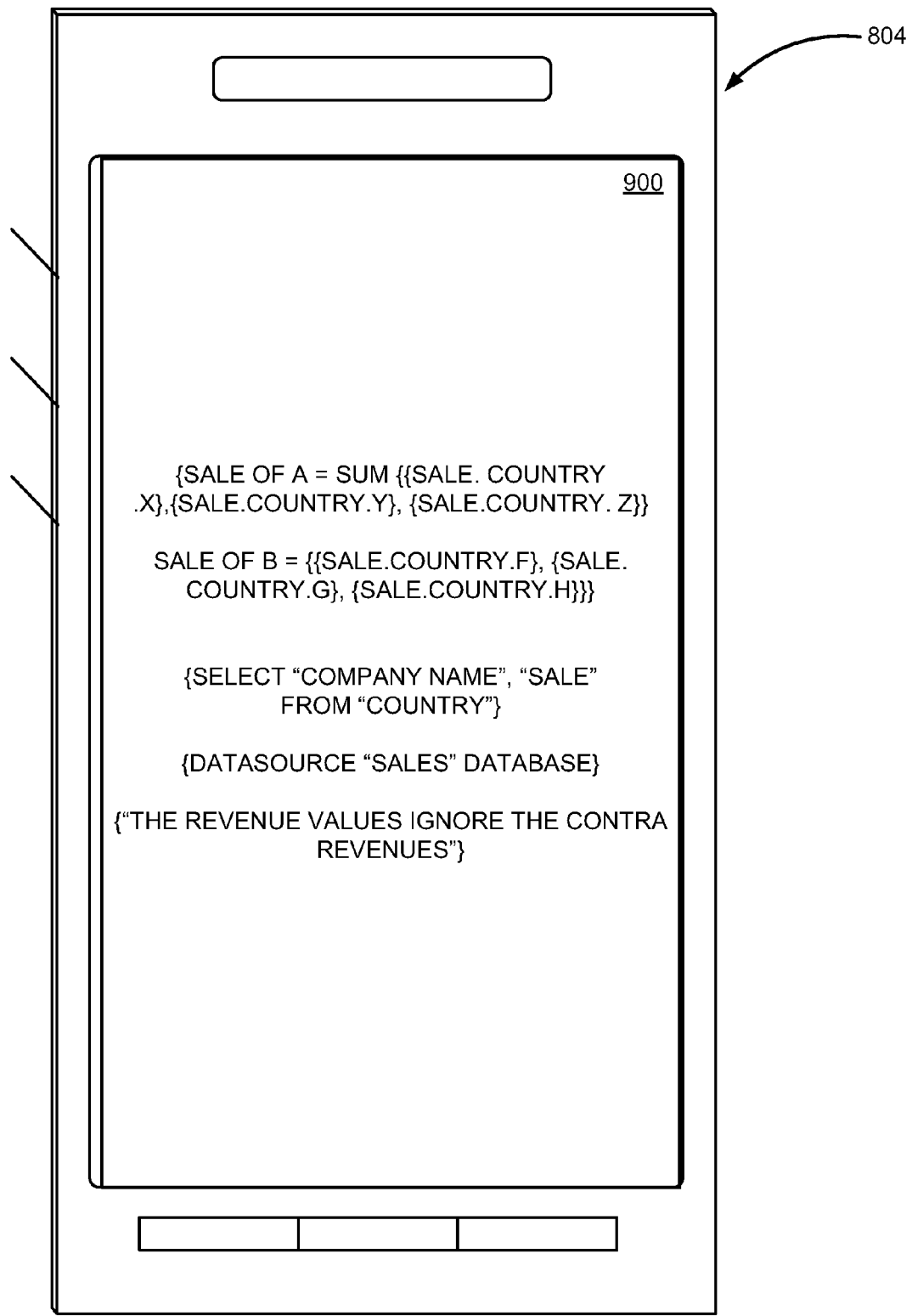
FIG. 9 illustrates the smartphone of FIG. 8 displaying the obtained report characterization information of the report of FIG. 8, according to an embodiment.

FIG. 9 illustrates the smartphone 804 of FIG. 8 displaying the obtained report characterization information of the report 800 of FIG. 8, according to an embodiment. After the two dimensional barcode reader obtains the report characterization information, the report characterization information of the report 800 of FIG. 8, may be displayed on a display 900 of the smartphone 804.

Some embodiments of the invention may include the above-described methods being written as one or more software components. These components, and the functionality associated with each, may be used by a client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments of the invention may include remote procedure calls or web services being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hard-wired circuitry in place of, or in combination with machine readable software instructions.

Figure 10:
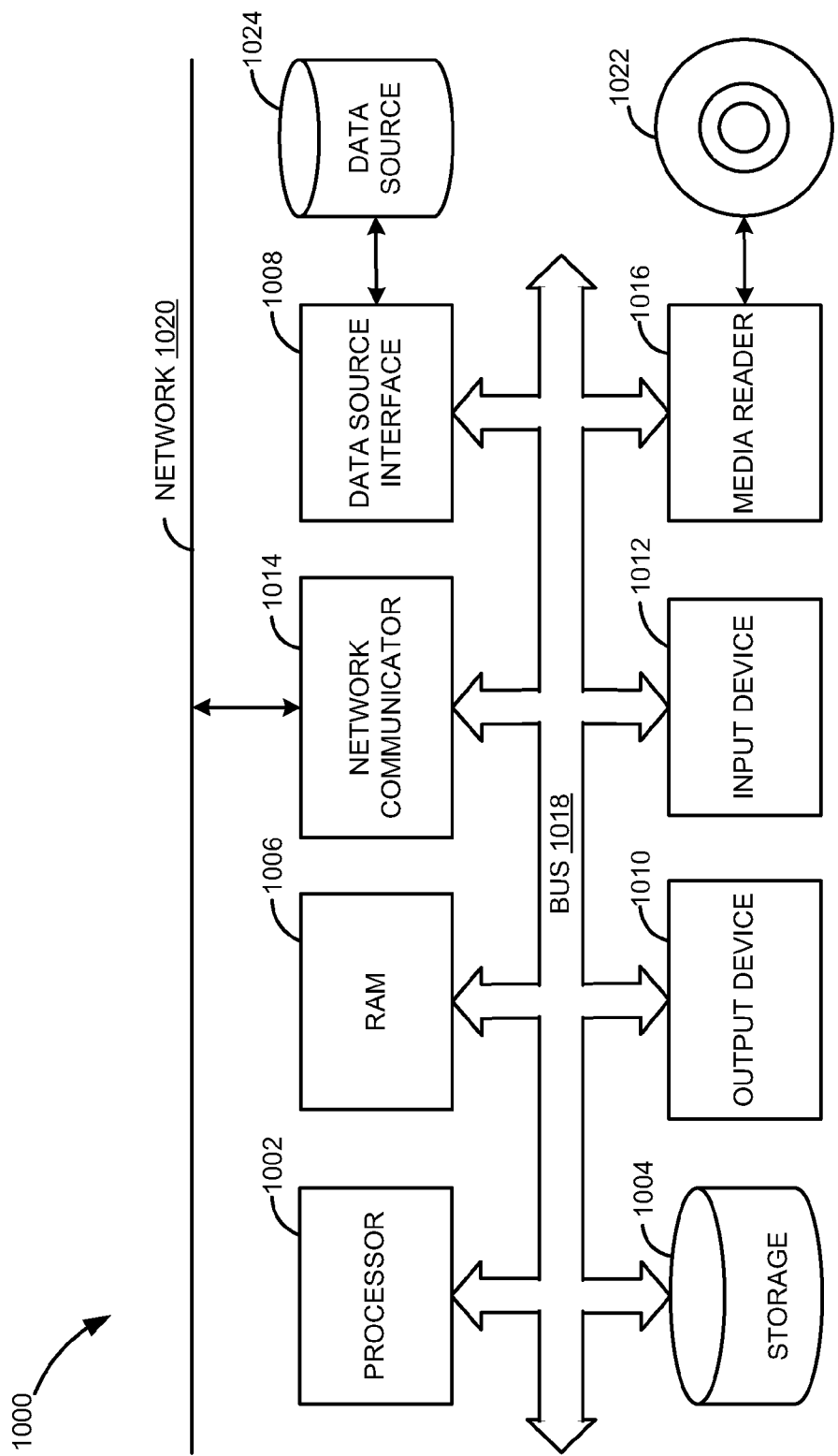
FIG. 10 is a block diagram illustrating a computing environment in which the techniques described for delivering report characterization information of a report can be implemented, according to an embodiment.

FIG. 10 is a block diagram of an exemplary computer system 1000. The computer system 1000 includes a processor 1002 that executes software instructions or code stored on a computer readable storage medium 1022 to perform the above-illustrated methods of the invention. The computer system 1000 includes a media reader 1016 to read the instructions from the computer readable storage medium 1022 and store the instructions in storage 1004 or in random access memory (RAM) 1006. The storage 1004 provides a large space for keeping static data where at least some instructions could be stored for later execution. The stored instructions may be further compiled to generate other representations of the instructions and dynamically stored in the RAM 1006. The processor 1002 reads instructions from the RAM 1006 and performs actions as instructed. According to one embodiment of the invention, the computer system 1000 further includes an output device 1010 (e.g., a display) to provide at least some of the results of the execution as output including, but not limited to, visual information to users and an input device 1012 to provide a user or another device with means for entering data and/or otherwise interact with the computer system 1000. Each of these output devices 1010 and input devices 1012 could be joined by one or more additional peripherals to further expand the capabilities of the computer system 1000. A network communicator 1014 may be provided to connect the computer system 1000 to a network 1020 and in turn to other devices connected to the network 1020 including other clients, servers, data stores, and interfaces, for instance. The modules of the computer system 1000 are interconnected via a bus 1018. Computer system 1000 includes a data source interface 1008 to access data source 1024. The data source 1024 can be accessed via one or more abstraction layers implemented in hardware or software. For example, the data source 1024 may be accessed by network 1020. In some embodiments the data source 1024 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open DataBase Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments of the invention. One skilled in the relevant art will recognize, however that the invention can be practiced without one or more of the specific details or with other methods, components, techniques, etc. In other instances, well-known operations or structures are not shown or described in details to avoid obscuring aspects of the invention.

Although the processes illustrated and described herein include series of steps, it will be appreciated that the different embodiments of the present invention are not limited by the illustrated ordering of steps, as some steps may occur in different orders, some concurrently with other steps apart from that shown and described herein. In addition, not all illustrated steps may be required to implement a methodology in accordance with the present invention. Moreover, it will be appreciated that the processes may be implemented in association with the apparatus and systems illustrated and described herein as well as in association with other systems not illustrated.

The above descriptions and illustrations of embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description. Rather, the scope of the invention is to be determined by the following claims, which are to be interpreted in accordance with established doctrines of claim construction.

The invention claimed is:

1. A computer implemented method for including report characterization information in a report, the method comprising:
  receiving, by a processor of a computer, a report characterization information retrieval formula comprising one or more expressions defining the report characterization information;
  executing, by the processor of the computer, the report characterization information retrieval formula defined to retrieve the report characterization information;
  based on the execution, retrieving, by the processor of the computer, the report characterization information, from one or more report information sources, wherein the report characterization information comprises metadata relating to the one or more report information sources used for creating the report;

encoding, by the processor of the computer, the retrieved report characterization information to obtain a two dimensional barcode; and inserting, by the processor of the computer, the two dimensional barcode, in the report.

2. The computer implemented method according to claim 1, further comprising:

receiving, by the processor of the computer, a request to modify the report characterization information retrieval formula;

executing, by the processor of the computer, the modified report characterization information retrieval formula, to retrieve modified report characterization information;

retrieving, by the processor of the computer, the modified report characterization information, from the one or more report information sources, wherein the modified report characterization information comprises the metadata relating to the one or more report information sources used for creating the report;

encoding, by the processor of the computer, the retrieved modified report characterization information to obtain a modified two dimensional barcode; and inserting, by the processor of the computer, the modified two dimensional barcode in the report.

3. The computer implemented method according to claim 1, further comprising:

receiving, by the processor of the computer, a request to modify a property of the inserted two dimensional barcode; and based on the received request, modifying, by the processor of the computer, the property of the inserted two dimensional barcode.

4. The computer implemented method according to claim 1, wherein inserting the two dimensional barcode in the report includes:

receiving a request to include the two dimensional barcode in the report;

based on the received request, inserting, by the processor of the computer, a placeholder image of the two dimensional barcode in the report; and replacing, by the processor of the computer, the placeholder image of the two dimensional barcode with the obtained two dimensional barcode.

5. The computer implemented method according to claim 1, wherein executing the report characterization information retrieval formula comprises:

based on context information of a portion of the report, executing, by the processor of the computer, the report characterization information retrieval formula defined to retrieve report characterization information related to the portion of the report;

based on the execution, retrieving, by the processor of the computer, the report characterization information related to the portion of the report, from the one or more report information sources;

encoding, by the processor of the computer, the retrieved report characterization information related to the portion of the report to obtain the two dimensional barcode; and inserting, by the processor of the computer, the obtained two dimensional barcode in the report.

6. The computer implemented method according to claim 1, further comprising:

receiving a copy of the report including the two dimensional barcode;

scanning, by a two dimensional barcode reader, the two dimensional barcode included in the copy of the report;

based on the scanning, decoding, by the processor of the computer, the two dimensional barcode to obtain the report characterization information; and displaying the obtained report characterization information.

7. The computer implemented method according to claim 1, wherein receiving a copy of the report includes:

receiving a hard copy of the report including the two dimensional barcode.

8. The computer implemented method according to claim 1, wherein the report characterization information further comprises metadata relating to the report, and a report definition, wherein the metadata relating to the report includes a date of creating the report, a date of modifying the report and an author of the report.

9. The computer implemented method according to claim 1, wherein the metadata relating to the one or more report information sources used for creating the report, comprises one or more names of the one or more report information sources, data lineage and trust information.

10. An article of manufacture including a computer readable storage medium to tangibly store instructions, which when executed by a computer, cause the computer to:

receive a report characterization information retrieval formula comprising one or more expressions defining report characterization information;

execute the report characterization information retrieval formula defined to retrieve the report characterization information;

based on the execution, retrieve the report characterization information, wherein the report characterization information comprises metadata relating to one or more report information sources used for creating the report;

encode the retrieved report characterization information to obtain a two dimensional barcode; and insert the two dimensional barcode in the report.

11. The article of manufacture according to claim 10, further comprising instructions which when executed by the computer further causes the computer to:

receive a request to modify the report characterization information retrieval formula;

execute a modified report characterization information retrieval formula, to retrieve the modified report characterization information from the one or more report information sources, wherein the modified report characterization information comprises metadata relating to the one or more report information sources used for creating the report;

encode the retrieved modified report characterization information to obtain a modified two dimensional barcode; and insert the modified two dimensional barcode in the report.

12. The article of manufacture according to claim 10, further comprising instructions which when executed by the computer further causes the computer to:

receive a request to modify a property of the inserted two dimensional barcode; and based on the received request, modify the property of the inserted two dimensional barcode.

13. The article of manufacture according to claim 10, further comprising instructions which when executed by the computer further causes the computer to:

receive a request to include the two dimensional barcode in the report;

based on the received request, insert a placeholder image of the two dimensional barcode in the report; and replace the placeholder image of the two dimensional barcode with the obtained two dimensional barcode.

14. The article of manufacture according to claim 10, further comprising instructions which when executed by the computer further causes the computer to:

based on context information of a portion of the report, execute the report characterization information retrieval formula defined to retrieve report characterization information related to the portion of the report;

based on the execution, retrieve the report characterization information related to the portion of the report, from the one or more report information sources;

encode the retrieved report characterization information related to the portion of the report to obtain the two dimensional barcode; and insert the obtained two dimensional barcode in the report.

15. The article of manufacture according to claim 10, further comprising instructions which when executed by the computer further causes the computer to:

receive a copy of the report including the two dimensional barcode;

scan, by a two dimensional barcode reader, the two dimensional barcode included in the copy of the report;

based on the scanning, decode the two dimensional barcode to obtain the report characterization information; and display the obtained report characterization information.

16. The article of manufacture according to claim 10, further comprising instructions which when executed by the computer further causes the computer to:

receive a hard copy of the report including the two dimensional barcode.

17. A computer system for including a report characterization information in a report, the computer system comprising:

a memory to store a program code; and a processor communicatively coupled to the memory, the processor configured to execute the program code to:

receive a report characterization information retrieval formula comprising one or more expressions defining the report characterization information;

execute the report characterization information retrieval formula defined to retrieve the report characterization information;

based on the execution, retrieve the report characterization information, wherein the report characterization information comprises metadata relating to one or more report information sources used for creating the report and a report;

encode the retrieved report characterization information to obtain a two dimensional barcode; and insert the two dimensional barcode in the report.

18. The system of claim 17, wherein the processor further executes the program code to:

receive a request to modify the report characterization information retrieval formula;

execute the modified report characterization information retrieval formula, to retrieve a modified report characterization information from the one or more report information sources, wherein the modified report characterization information comprises metadata relating to the one or more report information sources used for creating the report;

encode the retrieved modified report characterization information to obtain a modified two dimensional barcode; and insert the modified two dimensional barcode in the report.

19. The system of claim 17, wherein the processor further executes the program code to:

receive a request to modify a property of the inserted two dimensional barcode; and based on the received request, modify the property of the inserted two dimensional barcode.

20. The system of claim 17, wherein the processor further executes the program code to:

receive a request to include the two dimensional barcode in the report;

based on the received request, insert a placeholder image of the two dimensional barcode in the report; and replace the placeholder image of the two dimensional barcode with the obtained two dimensional barcode.

21. The system of claim 17, wherein the processor further executes the program code to:

based on a context information of a portion of the report, execute a report characterization information retrieval formula defined to retrieve report characterization information related to the portion of the report;

based on the execution, retrieve the report characterization information related to the portion of the report, from the one or more report information sources;

encode the retrieved report characterization information related to the portion of the report to obtain the two dimensional barcode; and insert the obtained two dimensional barcode in the report.

22. The system of claim 17, wherein the processor further executes the program code to:

receive a copy of the report including the two dimensional barcode;

scan, by a two dimensional barcode reader, the two dimensional barcode included in the copy of the report;

based on the scanning, decode the two dimensional barcode to obtain the report characterization information; and display the obtained report characterization information.

* * * * *